United States Patent [19]

Dunn, Jr.

[11] 3,912,701

[45] Oct. 14, 1975

[54] OLEFIN POLYMERIZATION PROCESS

[75] Inventor: George Harvey Dunn, Jr., Odessa, Tex.

[73] Assignee: Dart Industries Inc., Los Angeles, Calif.

[22] Filed: Mar. 25, 1974

[21] Appl. No.: 454,509

[52] U.S. Cl. ...... 260/93.7; 260/94.9 B; 260/94.9 F; 260/94.9 P
[51] Int. Cl.² C08F 4/52; C08F 10/00; C08F 10/06
[58] Field of Search .......... 260/94.9 P, 94.9 F, 93.7, 260/94.9 B

[56] References Cited
UNITED STATES PATENTS

| | | |
|---|---|---|
| 2,993,036 | 7/1961 | Thomka et al. ................ 260/94.9 P |
| 3,220,998 | 11/1965 | Berger ............................ 260/94.9 P |
| 3,257,332 | 6/1966 | Ziegler et al. .................. 260/94.9 B |
| 3,652,527 | 3/1972 | Trieschmann et al. ......... 260/94.9 P |
| 3,729,455 | 4/1973 | Harwell et al. ................. 260/94.9 P |

Primary Examiner—Alan Holler
Attorney, Agent, or Firm—Fred S. Valles; Margareta LeMaire

[57] ABSTRACT

An improved process for the polymerization of alpha-olefin employing liquid diluent and a titanium chloride catalyst activated with an organoaluminum compound, wherein by means of separately introducing the catalyst and the organoaluminum activator at specific locations in the process cycle, the use of olefin feed containing catalyst contaminants is possible without sacrifice in catalyst efficiency.

6 Claims, 1 Drawing Figure

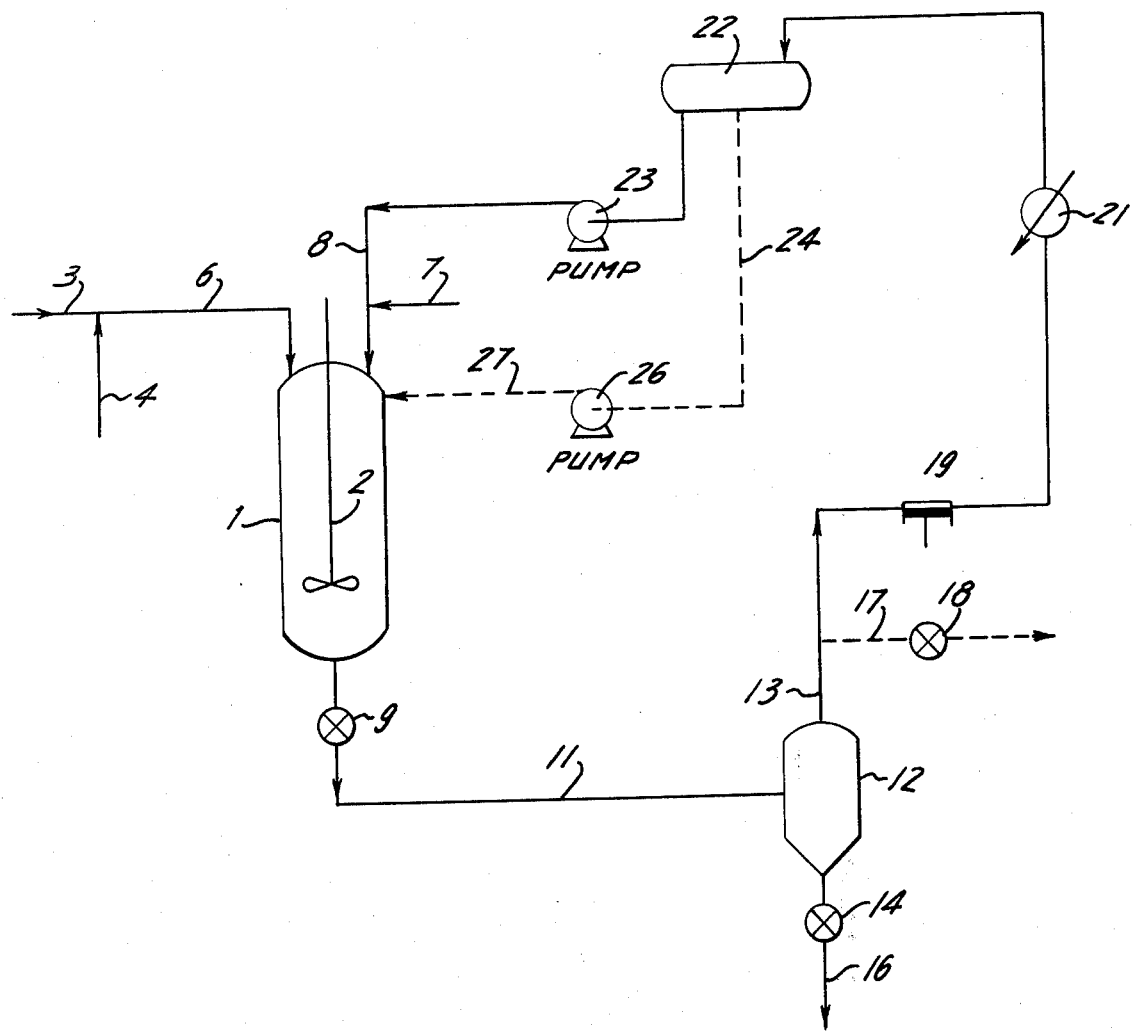

OLEFIN POLYMERIZATION PROCESS

The present invention relates to a continuous process for the polymerization of α-olefins in the presence of a titanium chloride catalyst activated with an organoaluminum compound, and more particularly to a method of providing high purity monomer feed to the reactor from a source of relatively impure monomer.

It is well known to continuously polymerize α-olefins employing titanium trichloride catalysts activated with organoaluminum compounds in a polymerization zone wherein there is formed a polymer slurry comprising unreacted monomer and to subsequently flash the slurry in a lower pressure zone to obtain a vapor stream containing unreacted monomer and a substantially dry polymer stream. It is also well known that the titanium catalysts are extremely sensitive to contaminants in the monomer feed such as oxygen, oxygen containing and sulfur containing compounds, e.g. water, alcohols, oxides of carbon, carbonyl compounds, hydrogen sulfide, mercaptans and the like. Because of the small quantities of catalyst used in the polymerization such poisonous impurities even at very small concentrations tend to destroy at least part of the activity of the catalyst and inherently the catalyst efficiency (expressed in unit weight of polymer produced per unit weight of $TiCl_3$ catalyst added) is decreased. It has also been found that the proportion of amorphous polymer in the product is increased when the catalyst has been partially deactivated by said poisons.

Heretofore, these problems have been avoided to a great extent and wherever possible by removal of the impurities by means of superfractionation treatment by molecular sieves and other finishing techniques. However, the operating cost and energy consumption of such finishing installations are high, which render the clean-up of the monomer less and less practicable as energy becomes more scarce and costly.

It is therefore an object of the present invention to provide a novel process for the bulk polymerization of α-olefins in the presence of titanium trichloride catalyst activated by organoaluminum compound at high catalyst efficiencies.

It is also an object of the invention to provide a high purity monomer feed to a bulk polymerization reaction zone from a less pure source.

These and other objects will become readily apparent from the ensuing description of the present invention.

In accordance with the present invention there is provided a process which comprises adding at least a portion of an organoaluminum compound to a stream of an α-olefin containing impurities which are detrimental to titanium trichloride catalyst to deactivate said impurities, feeding the treated monomer stream to a polymerization zone maintained at elevated pressure, separately introducing titanium trichloride catalyst to the reactor with a stream comprised of monomer and obtained as hereinafter described, removing a slurry comprised of polymer and unreacted monomer from the reactor, flashing the slurry to obtain a vapor stream comprised of unreacted monomer and a polymer stream, compressing at least a portion of the vapor stream comprised of unreacted monomer and employing at least a portion of said compressed stream for the introduction of the titanium catalyst to the reactor.

As used in this specification and in the claims, an alpha-olefin is to mean a monomer such as ethylene, propylene, butene-1, pentene-1 and olefins containing up to 10 carbon atoms and including branched α-olefins such as 3-methyl-butene-1, 4-methyl-pentene-1, 4-and 5-methylheptenes-1 and the like. It is also within the scope of the invention to use mixtures of such α-olefins.

The titanium catalyst employed in the process include solid titanium trichloride or a co-crystallization product of titanium trichloride and aluminum chloride. The preferred form for the catalyst is $n\ TiCl_3 \cdot AlC_3$, the letter $n$ representing a number that can vary from 1 to 5. The amount of catalyst used in the polymerization is quite small and usually ranges between about 0.0002 and about 0.003 parts by weight of total monomer feed. In order to prevent deactivation of the catalyst due to exposure to air or water, it is admixed prior to introduction into the reaction vessel with an inert carrier. Examples of such carriers are high viscosity hydrocarbons or hydrocarbon mixtures, such as the refined oils known in the art as white oils or white mineral oils (viscosity of approximately 200–1000 Saybolt universal seconds at 100°F) and the various petrolatum (petroleum jelley) products. The preferred carriers are mineral oil and mineral oil-petrolatum mixtures. The proportion of inert carrier should be between 20 to 40 % of the weight of the mixture of the catalyst and the carrier, in order to provide a mixture (or mud) which can be metered accurately to the polymerization reactor and also be easily handled in commercially available pumping equipment, such as gear pumps and which is free from contamination from air and water. The organo aluminum compound used in the reaction can be aluminum trialkyl, or a dialkyl aluminum monohalide, wherein the alkyl groups can contain from 1 to 10 carbon atoms more specifically from 2 to 8 carbon atoms. The preferred halide is chlorine. The most preferred organoaluminum compounds are triethyl aluminum and diethyl aluminum chloride. There are two factors to take into consideration in determining the amount of organoaluminum to be used in the process: (1) the amount necessary to activate the titanium chloride catalyst, and (2) the amount necessary to deactivate the catalyst contaminant in the feed. Usually for activation purposes sufficient organoaluminum compound is used to provide a molar ratio of Al/Ti (excluding the aluminum present in a co-crystallized catalyst of the formula $n\ TiCl_3 \cdot AlC_3$) in the range of from about 1.5:1 to about 150:1, the preferred range being between about 1.9 and about 4:1.

For feed purification purposes about a stoichiometric quantity of organoaluminum compound should be used to deactivate the contaminants, i.e. oxygen, oxygen containing and sulfur containing compounds. The concentrations of such contaminants in the monomer are easily determined by analysis. The overall quantity of organoaluminum is thus the sum of the quantities needed for catalyst activation and feed purification.

Conveniently, the total amount of organoaluminum compound is added to the impure monomer stream, however, it is also within the scope of the invention to introduce only a portion of the total organoaluminum compound into the impure feed and the remaining portion directly into the reaction zone. The minimum amount to be added to the impure feed is the stoichiometric amount necessary to react with the catalyst contaminants therein. In order to achieve the intimate contact necessary for the feed purification the organoaluminum compound should be introduced into the impure feed at least 40 pipe diameters from the reactor inlet. If desired, reaction products formed in the purification can be separated from the monomer, e.g. by filtration, however, such a separation step is not necessary.

The catalyst mud is introduced through a nozzle into the reactor. Since it is important to keep the nozzle clear at all times to prevent polymerization occuring at the outlet portion of the nozzle, the inlet thereof is also connected to a monomer feed line, the monomer serving to wash the catalyst mud into the reactor. It is an essential feature of this invention that the monomer stream used for this purpose is obtained from the flash zone wherein the reactor slurry is separated into relatively dry polymer and vapor comprised of unreacted monomer. This is so because any other monomer stream would have a detrimental effect upon the titanium catalyst. Thus, if the treated monomer feed were to be used, the presence of organoaluminum compound therein would prematurely activate the catalyst in the nozzle and cause plugging to occur therein due to polymerization. Untreated monomer on the other hand would be completely unsuitable because of the presence therein of the contaminants which deactivate the catalyst. However, the monomer-containing stream from the flash zone obtained in accordance with the invention is substantially completely free from catalyst contaminants as well as from the organoaluminum activator due to the low vapor pressure thereof at the temperature prevailing in the flash zone. Any unreacted organoaluminum compound will remain with the solid polymer product.

The polymerization process of this invention will be described with reference to the polymerization of propylene, although as previously understood, the invention is applicable to other alpha-olefins. The preferred polymerization involving propylene is one wherein propylene is employed as the polymerizable monomer, as well as the diluent for the polymerization reaction (bulk reaction). While propylene has been indicated as the preferred monomer and polymerization medium, the process is applicable, likewise, tho those systems wherein an extraneous diluent (or mixtures of an extraneous diluent and liquid propylene) such as a normally gaseous material is condensed and is used as the polymerization medium. Examples of suitable normally gaseous diluents are propane and butane. It is preferred to employ volatile gases as diluent media in this embodiment of the process, sinced immediately following the polymerization reaction which is usually conducted at pressures above 150 psig, the polymer slurry is let down in pressure to, for example, 50 psig or less in a low pressure zone (meaning a zone maintained at a pressure lower than that in the polymerization reaction) where due to the drop in pressure and the volatile nature of the polymerization ingredients, there is a flashing of these volatiles from the solid polymer. This flashing, which can be aided by heating, results in a polymer powder which is substantially dry and which by this term is to be understood to be a polymer containing 5% or less volatiles. The unreacted monomer, whether they be propylene and/or propylene and another α-olefin, e.g. ethylene (in cases involving random copolymers), are taken overhead from this low pressure flashing zone and at least a portion thereof is compressed and condensed. At least part of the compressed liquid is used to wash the catalyst into the reactor. Inasmuch as only a relatively small portion of liquid is actually needed for this purpose, i.e. between about 10 and 50% of the total feed, any remaining portion of the compressed liquid can be introduced directly to the reactor, if so desired. Usually a purge stream is removed from the system prior to compression to prevent excessive buildup of various impurities and modifiers such as hydrogen etc. Alternately, only the portion of unreacted monomer necessary for washing the catalyst mud into reactor is compressed and condensed, while the remaining monomer vapors from the flash zone are sent to a feed purification unit to remove hydrogen and the like. In those cases where an inert diluent is used in the polymerization the fresh makeup necessary to compensate for the losses occuring from the system (with solid polymer, and purge stream) is preferably also treated with organoaluminum compound to decativate any impurities present therein. Also, in case of a subsequent block copolymerization step, the monomer used in forming the polymer post block is suitably treated with sufficient quantities of organoaluminum compound to remove catalyst contaminant.

In propylene polymerization reactions with which this invention is specifically concerned, liquid propylene is polymerized in the presence of the catalyst in a reaction zone at temperatures of from 50° to 200°F or above, but preferably temperatures below the melting point of the polymer formed or temperatures at which the polymer would go into solution in the polymerization media and pressures sufficiently high to keep the reactants in the polymerization zone in the liquid phase. Suitably, for propylene and/or normally gaseous diluents such as propane or butane, pressures of 150 psi and higher will maintain the reactants and/or diluents in liquid form. Total solids in the reaction zone, in accordance with this system, are ordinarily in the order of from 15 to 50%, although obviously lower or higher, for example up to 60% polymer solids can be achieved. In order, however, to efficiently handle the slurry, it is preferred to keep the polymerization to the percent solids above indicated. The reaction is continuous and propylene and catalyst are continuously introduced to the reaction system and substantially continuously withdrawn therefrom through a cyclic discharge valve which simulates continuous operation. If desired, various modifiers such as hydrogen may be added to alter the properties of the polymer product. Such modifiers are well known in the art and need not be discussed in any further detail since they form no part of this invention. The polymer is subsequently passed to a deashing zone to remove catalyst residues and low molecular weight amorphous polymer by techniques well known in the art.

Reference is now made to the accompanying drawing which illustrates a preferred embodiment of this invention. In the drawing 1 indicates a polymerization vessel equipped with a stirrer as indicated at 2. Liquid propylene is introduced at 3 and mixed in line 6 with diethyl aluminum chloride conveyed through line 4. Catalyst mud is fed through line 7 and washed into the reactor with propylene flowing in line 8. Cyclic discharge valve 9 is of the type that opens and closes continuously, so that slurry withdrawn from the vessel 1 simulates a continuous discharge operation. Line 11 conveys the polymer slurry, which due to the drop in pressure is at this point substantially a vapor and a solid, to a combination cyclone-bag filter combination 12, where a separation or flashing occurs with unreacted propylene monomer flashing overhead through line 13, while polymer powder is discharged through valve 14 and line 16 for further treatment (not shown). The propylene vapor is taken via compressor 19 to condenser 21, surge tank 22 and pump 23 where the monomer is in liquid form and recycled to the reactor 1 via line 8. A portion of the liquid monomer collected in surge tank 22 may be fed directly via conduit 24, pump 26 and conduit 27 into reactor 1. If desired, a portion of the propylene vapor can be withdrawn through valve 17 and line 18 as a purge gas stream. Alternately it can be conveyed back to the propylene purification.

The comparative examples given below demonstrate the superior catalyst efficiency and product quality had when an α-olefin monomer feed stream is treated with an organoaluminum compound prior to its introduction into the reactor.

CONTROL EXAMPLE I

A one-liter steel reactor was charged with 136 mg of catalyst having the formula 3·TiCl$_3$·AlCl$_3$ and/the catalyst was activated with 159 mg diethyl aluminum chloride diluted to a 0.66 molar solution with n-heptane. The reactor was pressured with hydrogen to 7.5 psig. 400c (4.8 moles) of chemical grade liquid propylene containing 300 ppm of water on a mole basis was then charged into the reactor. Under agitation the reactor content was heated to 65°C and maintained at that temperature for 2 hours, after which the polymer was removed from the reactor and dried. A yield of 87 gms of undeashed polymer was obtained having a heptane insolubles content of 89.7 percent by weight. The productivity of the titanium catalyst was thus 640 gms polymer per gram of catalyst.

EXAMPLE II

A second run was made demonstrating the improved results had when treating the propylene with an additional quantity of diethyl aluminum chloride prior to its introduction into the reactor. Thus the propylene monomer was pretreated with a stoichiometric amount of diethyl aluminum chloride amounting to one mole per mole of water present in the monomer. The reactor was charged with the same amounts of catalyst and diethyl aluminum chloride as in Control Example I and then 400 cc of propylene mixed with 175 mg of diethyl aluminum chloride was added. The polymerization conditions of Control Example I were maintained and 118 gms of dry polymer was obtained. The productivity was 870 gms polymer per gms of catalyst which is within the normal range observed in similar laboratory experiments using polymerization grade propylene containing negligable quantities of harmful impurities. The higher percentage of heptane insolubles in the product (92.1 wt%) is believed to be a significant increase, indicating a higher concentration of crystalline polymer in the product.

CONTROL EXPERIMENT III

This experiment was run to demonstrate that the improvement in yield and productivity demonstrated by Example II was caused by the pretreatment of the propylene feed prior to its contact with the catalyst and not by the increased amount of diethyl aluminum chloride per se. The reactor was again charged with 136 mg of the titanium catalyst, 400 cc of untreated propylene was added and then 334 mg of diethyl aluminum chloride. The same polymerization conditions were maintained as in the previous examples. The yield and productivity were again lower than normal: 68 gm and 500 gms polymer per gram of catalyst, respectively. Also the percent heptane solubles (90.7 wt%) was believed lower than normal.

EXAMPLE IV

This example was run to demonstrate that the unreacted monomer withdrawn from the reactor is an excellent medium for introducing catalyst into a reactor without experiencing premature polymerization problems.

The conditions of Example II were repeated with the exception that the monomer had been pretreated with a larger quantity of diethyl aluminum chloride (400 mg) than before (175 mg). After the polymerization, the unreacted monomer was vaporized and bubbled through dilute sulfuric acid (5%) to hydrolyze any organoaluminum compound present in the vapor. Analysis of the dilute sulfuric acid for aluminum indicated only 0.5 ppm based on the weight of unreacted monomer. However, this trace amount of aluminum is directly attibutable to presence of aluminum compounds in the sulfuric acid; hence an unreacted monomer stream withdrawn from a zone separating polymer from monomer will contain no detrimental quantities of organoaluminum compounds causing premature polymerization, when practicing the present invention.

What is claimed is:

1. In a continuous process for the polymerization of an α-olefin feed substantially free of catalyst contaminants in the presence of a titanium trichloride catalyst activated by an organoaluminum compound in a molar ratio of organoaluminum compound to titanium chloride between about 1.5:1 and about 150:1 in a reaction zone maintained at elevated pressure, wherein a slurry comprised of polymer and unreacted monomer is withdrawn from the reaction zone, and the slurry is flashed in a low pressure separation zone from which are separately withdrawn a vapor comprised of unreacted monomer and a polymer, the improvement which comprises: intimately contacting an α-olefin stream containing catalyst contaminants with at least a sufficient amount of organoaluminum compound to deactivate said catalyst contaminants and to provide said α-olefin feed substantially free of catalyst contaminants and passing said feed in the absence of catalyst directly to the reaction zone, compressing at least a portion of the vapor from the low pressure separation zone and introducing the titanium trichloride catalyst in the absence of organoaluminum compound with at least part of the compressed stream directly into the reaction zone.

2. A process according to claim 1 wherein at least a portion of the organoaluminum compound used for catalyst activation purposes is introduced directly into the reaction zone.

3. A according to claim 1 wherein the total amount of organoaluminum compound used in the process is contacted with the α-olefin stream containing catalyst contaminants to provide the α-olefin feed substantially free of catalyst contaminants and containing sufficient unreacted organoaluminum compound to provide the molar ratio thereof to titanium trichloride catalyst between about 1.5:1 and about 150:1 in the reaction zone.

4. A process according to claim 1 wherein the α-olefin feed is propylene.

5. A process according to claim 1 wherein the titanium trichloride catalyst is a co-crystallization product of titanium trichloride and aluminum trichloride represented by the formula $n\text{TiCl}_3 \cdot \text{AlCl}_3$ wherein $n$ is a digit from 1 to 5.

6. A process according to claim 1 wherein the organoaluminum compound is diethyl aluminum chloride.

* * * * *

UNITED STATES PATENT OFFICE
CERTIFICATE OF CORRECTION

PATENT NO. : 3,912,701
DATED : October 14, 1975
INVENTOR(S) : George Harvey Dunn, Jr.

It is certified that error appears in the above—identified patent and that said Letters Patent are hereby corrected as shown below.

The chemical formulas appearing in the columns and lines indicated below should be deleted and respectively replaced with:

Column 1, line 26:    $TiCl_3$

Column 2, line 10:    $n\ TiCl_3 \cdot AlCl_3$

Column 2, line 45:    Al/Ti

Column 2, line 47:    $n\ TiCl_3 \cdot AlCl_3$

Column 8, line 1:    $n\ TiCl_3 \cdot AlCl_3$

In column 3, line 43 change "tho" to --to--

Signed and Sealed this twentieth Day of April 1976

[SEAL]

Attest:

RUTH C. MASON
Attesting Officer

C. MARSHALL DANN
Commissioner of Patents and Trademarks